(12) United States Patent
Prakash et al.

(10) Patent No.: US 8,763,112 B2
(45) Date of Patent: Jun. 24, 2014

(54) SYSTEMS AND METHODS FOR POWER-ON USER AUTHENTICATION

(75) Inventors: Gyan Prakash, Beaverton, OR (US); Saurabh Dadu, Tigard, OR (US); Selim Aissi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 38 days.

(21) Appl. No.: 13/175,833

(22) Filed: Jul. 2, 2011

(65) Prior Publication Data
US 2013/0007873 A1     Jan. 3, 2013

(51) Int. Cl.
*G06F 12/14* (2006.01)
*G06F 21/31* (2013.01)
*G06F 7/00* (2006.01)
*G06F 7/04* (2006.01)
*G06F 12/00* (2006.01)
*G06F 17/30* (2006.01)
*G11C 7/00* (2006.01)

(52) U.S. Cl.
CPC ...................................... *G06F 21/31* (2013.01)
USPC ................................ 726/18; 726/30; 713/186

(58) Field of Classification Search
USPC ........................................... 726/30; 713/186
See application file for complete search history.

(56) References Cited

U.S. PATENT DOCUMENTS

| | | | |
|---|---|---|---|
| 6,615,353 B1 | 9/2003 | Hashiguchi | |
| 7,366,497 B2 * | 4/2008 | Nagata | 455/410 |
| 7,941,847 B2 | 5/2011 | Rivera et al. | |
| 8,151,364 B2 * | 4/2012 | Hewitt et al. | 726/30 |
| 2003/0160692 A1 * | 8/2003 | Nonaka | 340/539.11 |
| 2008/0052526 A1 | 2/2008 | Dailey et al. | |
| 2009/0006857 A1 * | 1/2009 | Cheng | 713/183 |
| 2010/0153737 A1 * | 6/2010 | Jayet | 713/186 |
| 2010/0162373 A1 | 6/2010 | Springfield et al. | |
| 2011/0072511 A1 | 3/2011 | Gillespie | |
| 2011/0183648 A1 * | 7/2011 | Takagi | 455/411 |
| 2011/0185198 A1 * | 7/2011 | Ukita et al. | 713/300 |

FOREIGN PATENT DOCUMENTS

| | | |
|---|---|---|
| JP | 3657745 B2 | 3/2005 |
| JP | 2006315456 A | 11/2006 |
| KR | 1020080049972 A | 6/2008 |
| KR | 1020090127676 A | 12/2009 |
| WO | 2013006570 A1 | 1/2013 |

OTHER PUBLICATIONS

"Intel Active Management Technology", from Wikipedia, the free encyclopedia, Document retrieved on Nov. 9, 2011, 10 pages, Web page available at: http://en.wikipedia.org/wiki/Intel_Active_Management_Technology.

"Bios", from Wikipedia, the free encyclopedia, Document retrieved on Nov. 9, 2011, 8 pages, Web page available at: http://en.wikipedia.org/wiki/BIOS.

(Continued)

*Primary Examiner* — Shin-Hon Chen
(74) *Attorney, Agent, or Firm* — Barnes & Thornburg

(57) ABSTRACT

Embodiments of systems and methods for power-on user authentication are disclosed. A method for power-on user authentication may comprise receiving an authentication input with a security controller of a computing device prior to supplying power to a primary processor of the computing device, comparing the authentication input to an authentication code using the security controller, and supplying power to the primary processor in response to the authentication input matching the authentication code.

12 Claims, 3 Drawing Sheets

(56) References Cited

OTHER PUBLICATIONS

"Near Field Communication", from Wikipedia, the free encyclopedia, Document retrieved on Nov. 9, 2011, 20 pages, Web page available at: http://en.wikipedia.org/wiki/Near_field_communication.

International Search Report and Written Opinion received for International Application No. PCT/US12/45291, mailed Dec. 10, 2012, 9 pages.
International Preliminary Report on Patentability received for International Application No. PCT/US2012/045291, mailed on Jan. 16, 2014, 6 pages.

* cited by examiner

SYSTEMS AND METHODS FOR POWER-ON USER AUTHENTICATION

BACKGROUND

Modern computing devices, such as laptops, smartphones, mobile internet devices (MIDs), and tablets, often carry sensitive personal and professional data. Protection of such data from theft by malicious attack is increasingly important. As malicious attacks become more sophisticated, security is increasingly difficult. In response to those threats, user authentication schemes currently exist at different points in the boot process, such as at the BIOS (Basic Input Output System), PBA (Pre Boot Authentication level), or at the operating system (OS) log-on.

However, even those types of user authentication may be vulnerable to attack in certain circumstances. BIOS-based passwords are known to be insecure—the passwords are stored in memory at a known location and are thus susceptible to being disabled or hacked. Furthermore, BIOS-based passwords are optional and may not be enabled. Additionally, both PBA and OS passwords can be bypassed by changing the boot drive on the computing device or by selecting a boot source other than the hard disk. Moreover, most components of the computing device will be initialized and executing by the time the computing device is ready to accept a user authentication, which may leave the entire system vulnerable to attack.

BRIEF DESCRIPTION OF THE DRAWINGS

The invention described herein is illustrated by way of example and not by way of limitation in the accompanying drawings. For simplicity and clarity of illustration, elements illustrated in the drawings are not necessarily drawn to scale. For example, the dimensions of some elements may be exaggerated relative to other elements for clarity. Further, where considered appropriate, reference labels have been repeated among the drawings to indicate corresponding or analogous elements.

DETAILED DESCRIPTION OF THE DRAWINGS

Figure 1:
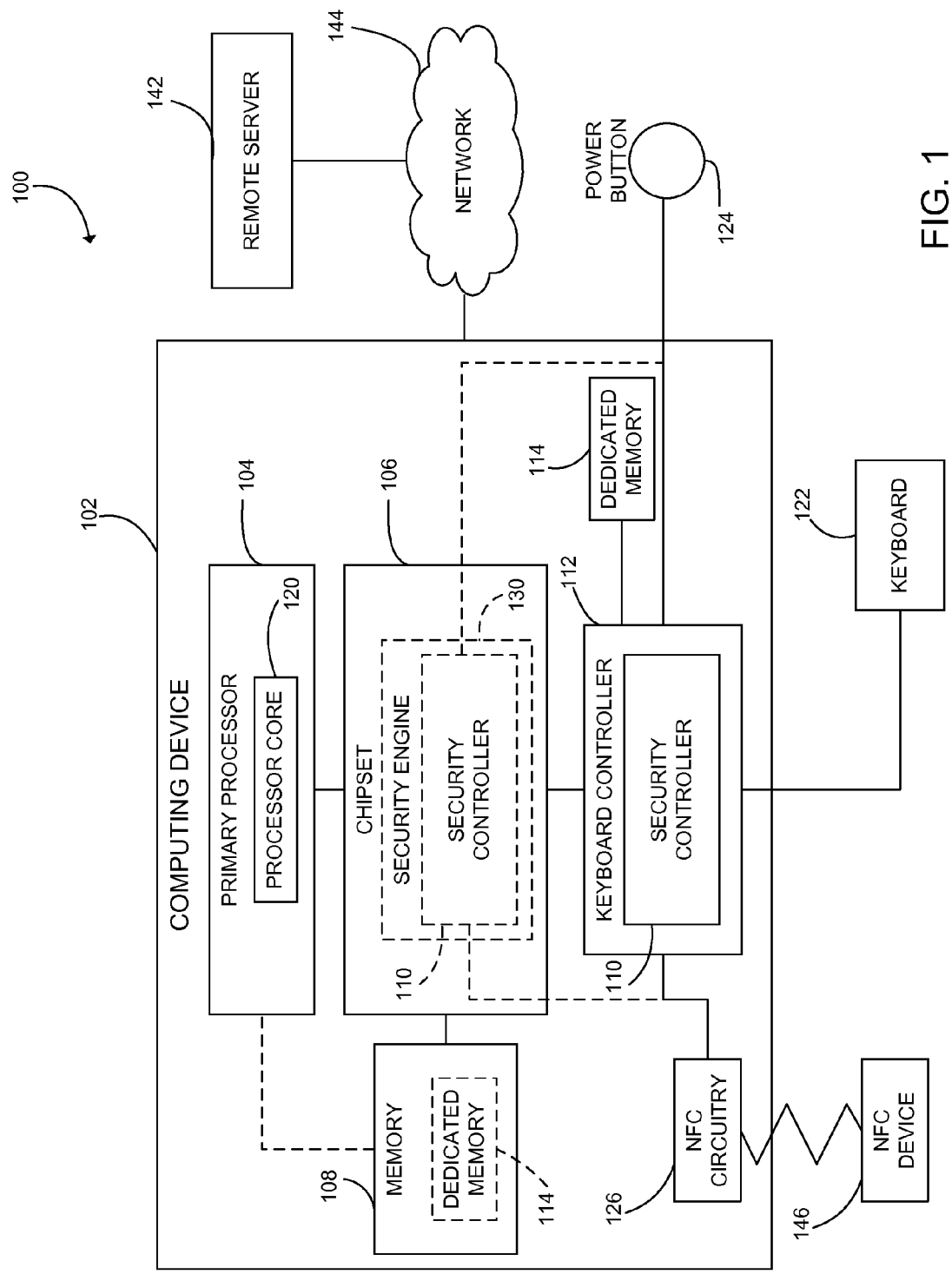
FIG. 1 is a simplified block diagram of one embodiment of a system including a computing device having power-on user authentication.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an illustrative embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Embodiments of the invention may be implemented in hardware, firmware, software, or any combination thereof. Embodiments of the invention implemented in a computing device may include one or more bus-based interconnects between components and/or one or more point-to-point interconnects between components. Embodiments of the invention may also be implemented as instructions stored on one or more non-transitory, machine-readable media, which may be read and executed by one or more processors and/or controllers. A non-transitory, machine-readable medium may include any tangible mechanism for storing or transmitting information in a form readable by a machine (e.g., a computing device). For example, non-transitory, machine-readable media may include read only memory (ROM); random access memory (RAM); magnetic disk storage media; optical storage media; flash memory devices; and others.

Figure 2:
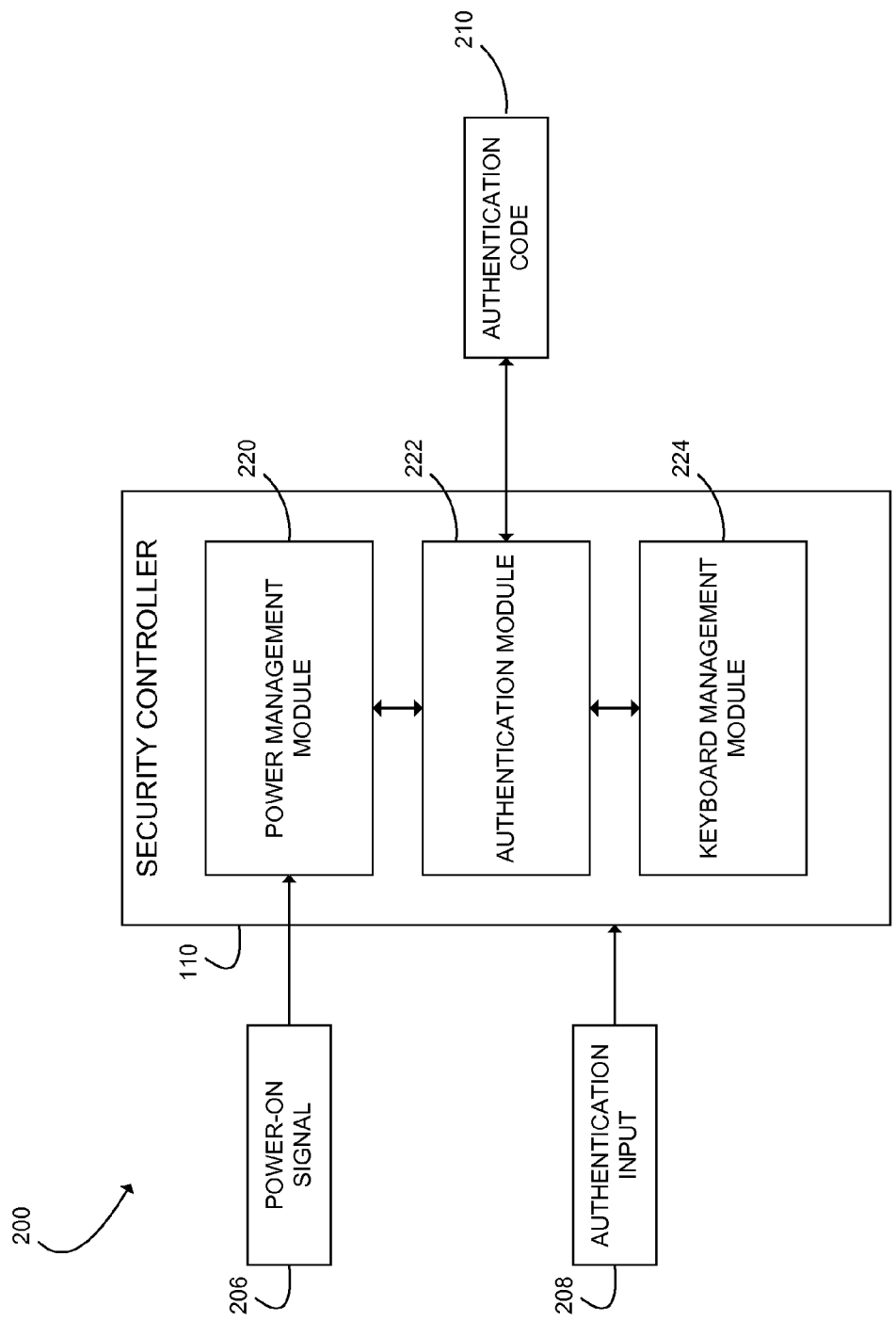
FIG. 2 is a simplified block diagram of one embodiment of a security controller of the computing device of FIG. 1.

Referring now to FIGS. 1 and 2, a system 100 for power-on user authentication comprises a computing device 102 including a primary processor 104 and a security controller 110. In one illustrative embodiment, discussed in more detail below, the security controller 110 authenticates a user prior to supplying power to the primary processor 104. When the security controller 110 receives a power-on signal 206 (e.g., from a power button 124), the security controller 110 initiates an authentication procedure. As part of the authentication procedure, the security controller 110 may receive an authorization input 208. The authorization input 208 may be embodied as a password entered via a keyboard 122, a communication from a near-field communications (NFC) device 146 in response to the NFC device 146 being brought into the proximity of NFC circuitry 126, or as other authorization data. As a further part of the authentication procedure, the security controller 110 also retrieves an authorization code 210 from a dedicated memory 114. The security controller 110 then compares the authorization input 208 and the authorization code 210. If the authorization input 208 and authorization code 210 match, the security controller 110 supplies power to the primary processor 104, allowing the computing device 102 to proceed with a boot.

The computing device 102 may be embodied as any type of computing device capable of performing the functions described herein. By way of example, the computing device 102 may be embodied as a laptop computer, a desktop computer, a server, a netbook, a smartphone, cellular phone, a mobile internet device, a tablet computing device, a handheld computer, a personal digital assistant, or other computing device. As shown in the illustrative embodiment of FIG. 1, the computing device 102 comprises a primary processor 104, a chipset 106, a memory 108, a keyboard controller 112, a dedicated memory 114, a keyboard 122, a power button 124, and NFC circuitry 126. In some embodiments, several of the foregoing components may be incorporated on a motherboard of the computing device 102, while other components may be communicatively coupled to the motherboard via, for example, a peripheral port. Furthermore, it will be appreciated by those of skill in the art that the computing device 102 may include other components, sub-components, and devices commonly found in a computer and/or computing device, which are not illustrated in FIG. 1 for clarity of the description.

The primary processor 104 of the computing device 102 may be embodied as any type of processor capable of executing software/firmware, such as a microprocessor, digital signal processor, microcontroller, or the like. The primary processor 104 is illustratively embodied as a single core processor having a processor core 120. However, in other embodiments, the primary processor 104 may be embodied as a multi-core processor having multiple processor cores 120. Additionally, the computing device 102 may include additional processors 104 having one or more processor cores 120. In other embodiments, the primary processor 104 may be part of a system-on-a-chip (SoC) integrated circuit. For example, the primary processor 104 could be the microprocessor of an SoC implementation as part of a smartphone. Additionally, in one particular embodiment, the primary processer 104 is embodied as a central processing unit (CPU) of the computing device 102.

The processor 104 is communicatively coupled to the chipset 106 via a number of signal paths. These signal paths (and the other signal paths illustrated in FIG. 1) may be embodied as any type of signal paths capable of facilitating communication between the components of the computing device 102. For example, the signal paths may be embodied as any number of wires, cables, light guides, printed circuit board traces, via, bus, intervening devices, and/or the like.

The chipset 106 of the computing device 102 may include a memory controller hub (MCH or "northbridge"), an input/output controller hub (ICH or "southbridge"), and a firmware device. The firmware device of the chipset 106 may be embodied as a memory device for storing Basic Input/Output System (BIOS) data and/or instructions and/or other information (e.g., a BIOS driver used during booting of the computing device 102). However, in other embodiments, chipsets having other configurations may be used. For example, in some embodiments, the chipset 106 may be embodied as a platform controller hub (PCH). In such embodiments, the MCH may be incorporated in or otherwise associated with the primary processor 104, and the primary processor 104 may communicate directly with the memory 108 (as shown by the dashed line in FIG. 1).

The memory 108 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. In the illustrative embodiment, the memory 108 is communicatively coupled to the chipset 106 via a number of signal paths. Various data and software may be stored in the memory 108. For example, one or more operating systems, applications, programs, libraries, and drivers that make up the software stack executed by the primary processor 104 may reside in memory 108 during execution. Furthermore, software and data stored in memory 108 may be swapped between the memory 108 and a data storage device (e.g. a hard disk drive) as part of memory management operations.

The computing device 102 further includes a keyboard controller 112 that is configured to monitor user inputs and to perform power management. The keyboard controller 112 may be embodied as an embedded controller that is communicatively coupled to the chipset 106 via a number of signal paths or, alternatively, that is part of the chipset 106. In the illustrative embodiment, the keyboard controller 112 is also communicatively coupled, via a number of signal paths, to the dedicated memory 114, the keyboard 122, the power button 124, and the NFC circuitry 126. As described below, the keyboard controller 112 is operable to receive input signals from the keyboard 122, the power button 124, and the NFC circuitry 126 and to perform various tasks in response to these inputs signals. Among other tasks, the keyboard controller 112 is responsible for managing the power supplied to various components of the computing device 102. As such, the keyboard controller 112 may selectively supply power to at least the primary processor 104. In some embodiments, the keyboard controller 112 may also gate power to other components of the computing device 102 (e.g., the chipset 106), in addition to gating power to the primary processor 104. The keyboard controller 112 may be persistently powered and capable of accepting an input signal from the power button 124 at any time.

The dedicated memory 114 may be embodied as any type of device configured for the short-term or long-term storage of data such as, for example, memory devices and circuits, memory cards, hard disk drives, solid-state drives, or other data storage devices. Various software, firmware, and/or data may be stored in the dedicated memory 114. For example, one or more software or firmware modules executable by the keyboard controller 112 may reside in the dedicated memory 114. Although the dedicated memory 114 is illustrated as a distinct component from the keyboard controller 112 in FIG. 1, it is contemplated that the dedicated memory 114 may be integrated into the keyboard controller 112 in other embodiments. In either case, the dedicated memory 114 is directly accessible to the keyboard controller 112 but is not directly accessible to other components of the computing device 102. In other words, the dedicated memory 114 is protected against unauthorized write operations and thus substantially secure from malicious attacks. The reserved nature of the dedicated memory 114 aids in the security of the software, firmware, and/or data accessed by the keyboard controller 112 during run-time.

The keyboard 122 of the computing device 102 may be any human-machine interface (HMI) that may be operated by a user of the computing device 102 to provide inputs to the computing device 102. In the illustrative embodiment, a user of the computing device 102 may press one or more keys of the keyboard 122, which the keyboard controller 112 will register as one or more keystrokes. It is contemplated that the keyboard 122 may be physical (e.g., as a standard personal computer keyboard) or virtual (e.g., a touchscreen on a smartphone or tablet, which may be independently powered or receive power from the keyboard controller 112).

The power button 124 may be embodied as any type of button, switch, or other mechanism configured to send a power-on signal 206 to the keyboard controller 112. In some embodiments, the power button 124 may also supply signals to the keyboard controller 112 that power-off the computing device 102 or place the computing device 102 into a sleep, suspend, or other low power mode of operation. Although the embodiment of FIG. 1 is illustrated with a power button 124, it should be appreciated that the power-on signal 206 may be generated by any number of sources (including sources remote from the computing device 102).

In some embodiments, the computing device 102 may also include NFC circuitry 126. The NFC circuitry 126 may comprise relatively short-ranged, high frequency wireless communications circuitry. For example, in some embodiments, the effective communications range of the NFC circuitry 126 may be approximately ten centimeters. This relatively short communications range of the NFC circuitry 126 allows validation of the physical presence of another device (i.e., the NFC device 146) by the NFC circuitry 126. The NFC device 146 may be embodied as any type of device capable of communicating with or being recognized by the NFC circuitry 126. By way of example, the NFC device 146 may be embodied as a smartphone or cellular phone.

As noted above, the computing device 102 also includes a security controller 110 configured to perform a power-on user authentication. The security controller 110 may be embodied as any number of hardware, firmware, and/or software modules that perform user authentication, power management, keyboard management, and/or other functions. In the illustrative embodiment of FIG. 1, the security controller 110 is embodied as a number of hardware, firmware, and/or software modules within the keyboard controller 112. In this illustrative embodiment, the security controller 110 is communicatively coupled to the dedicated memory 114, the keyboard 122, the power button 124, and the NFC circuitry 126, in the same manner described above with regard to the keyboard controller 112.

One illustrative embodiment of the software/firmware environment 200 of the security controller 110 is shown as a block diagram in FIG. 2. The security controller 110 illustratively includes a power management module 220, an authentication module 222, and a keyboard management module 224. Each of these modules 220-224 may be embodied as hardware, software, firmware or any combination thereof. Additionally, each of these modules 220-224 may be configured to receive one or more inputs (e.g., a power-on signal 206, an authentication input 208, and/or an authentication code 210), process data represented by the one or more inputs, and generate one or more outputs. These one or more outputs may be passed to another of the modules 220-224 or transmitted to another component of the computing device 102.

The power management module 220 of the security controller 110 is configured to receive the power-on signal 206 and to selectively supply power to the various components of the computing device 102. As discussed above, the power-on signal 206 may be received from the power button 124. In other embodiments, the power-on signal 206 may be received from another component of the computing device 102 or a remote source. Upon receiving the power-on signal 206, the power management module 220 may instruct the authentication module 222 to perform a user authentication. If the authentication module 222 returns a positive result (i.e., the user is authenticated), the power management module 220 will cause power to be supplied to the primary processor 104 of the computing device 102.

The authentication module 222 of the security controller 110 is configured to receive an authentication input 208, retrieve an authentication code 210, and compare the authentication input 208 to the authentication code 210. The authentication input 208 may be embodied as any input, data, or signal configured to authenticate a particular user to the computing device 102. In some embodiments, the authentication module 222 will receive the authentication input 208 via the keyboard management module 224. In such embodiments, the keyboard management module 224 monitors the keyboard 122 and registers one or more keystrokes input by a user of the computing device 102. The keyboard management module 224 then communicates the authentication input 208 to the authentication module 222. In other embodiments, the authentication input 208 may be a signal supplied to the authentication module 222 from the NFC circuitry 126 when an NFC device 146 associated with a particular user is brought into proximity with the NFC circuitry 126. In still other embodiments, the authentication input 208 may be provided by spoken word or other means of entering a unique authorization.

The authentication module 222 also retrieves the authentication code 210 from the dedicated memory 114. The authentication code 210 may be embodied as any data comprising a unique user identification. Each authorized user (and/or each NFC device 146 representing an authorized user) of the computing device 102 may have a unique authentication code 210 stored in the dedicated memory 114. In some embodiments, the authentication code 210 may be stored as a hash value in a hash table in the dedicated memory 114. After receiving the authentication input 208 and retrieving the authentication code 210, the authentication module 222 compares the two values to determine the authenticity of the authentication input 208. This comparison may be performed using any number of known methods. By way of example, where the authentication code 210 is stored as a hash value, the authentication module 222 may perform a hash of the authentication input 208 and compare the two hash values. The authentication module 222 may return the results to the power management module 220, which may then supply power to the primary processor 104 in response to a successful user authentication.

From time to time, the authentication code 210 may need to be changed or a new authorization code 210 added for a new user. After the user has been authenticated and power has been supplied to the primary processor 104, as described above, the user may request to change the password (or the NFC device 146 recognized by the computing device 102). In response, the authentication module 222 may listen for an authentication input 208, either from the keyboard management module 224 or the from the NFC circuitry 126. When an authentication input 208 is received, the authentication module 222 will treat the authentication input 208 as a new authentication code 210. The authentication module 222 may replace the old authentication code 210 stored in the dedicated memory 114 with this new authentication code 210.

Returning now to FIG. 1, in alternative embodiments, the security controller 110 may be embodied as a number of hardware, firmware, and/or software modules within a security engine 130 of the chipset 106 (as illustrated in phantom). The security engine 130 may include hardware, firmware, and/or software modules that are configured to perform security, encryption, and/or authentication functions. For example, the security engine 130 may be embodied as or otherwise include an out-of-band processor, a trusted platform module (TPM), and/or other security enhancing hardware and associated software modules. The security engine 130 may be persistently powered and capable of operating irrespective of the power state of the primary processor 104. In embodiments where the security controller 110 is located within the security engine 130 (rather than the keyboard controller 112), the dedicated memory 114 may be embodied as a secure portion of memory 108 accessible only to the security engine 130. The security controller 110 in such embodiments may also be in direct communication with the keyboard 122, the power button 124, and the NFC circuitry 126, or may access these components via the keyboard controller 112.

In addition to the computing device 102, the system 100 for power-on user authentication may also include a remote server 142 communicatively coupled to the computing device 102 via a network 144. The network 144 may be embodied as any number of various wired and/or wireless telecommunication networks. For example, the network 144 may be embodied as or otherwise include one or more cellular networks, telephone networks, local or wide area networks, publicly available global networks (e.g., the Internet), or any combination thereof. Furthermore, the network 144 may include any number of additional devices to facilitate communication between the computing device 102 and the remote server 142, such as routers, switches, intervening computers, and/or the like. The computing device 102 and the remote server 142 may use any suitable communication protocol to communicate with each other over the network 144.

The remote server 142 may be any type of computing device that is embodied outside of and discrete from the computing device 102 and is configured to support the security functions of the security controller 110 and/or the security engine 130. As one illustrative example, the remote server 142 may be embodied as an Intel® AntiTheft server. The remote server 142 and the computing device 102 may have an established trust relationship such that security is maintained during operations between the remote server 142 and the computing device 102. Due to this established trust relationship, the remote server 142 may communicate a new authentication code 210 to the security controller 110 of the computing device 102 periodically or in response to a request from the user. The security controller 110 may then replace the old authentication code 210 stored in the dedicated memory 114 with this new authentication code 210. Using this mechanism, a user may access the computing device 102 despite a forgotten password.

Figure 3:
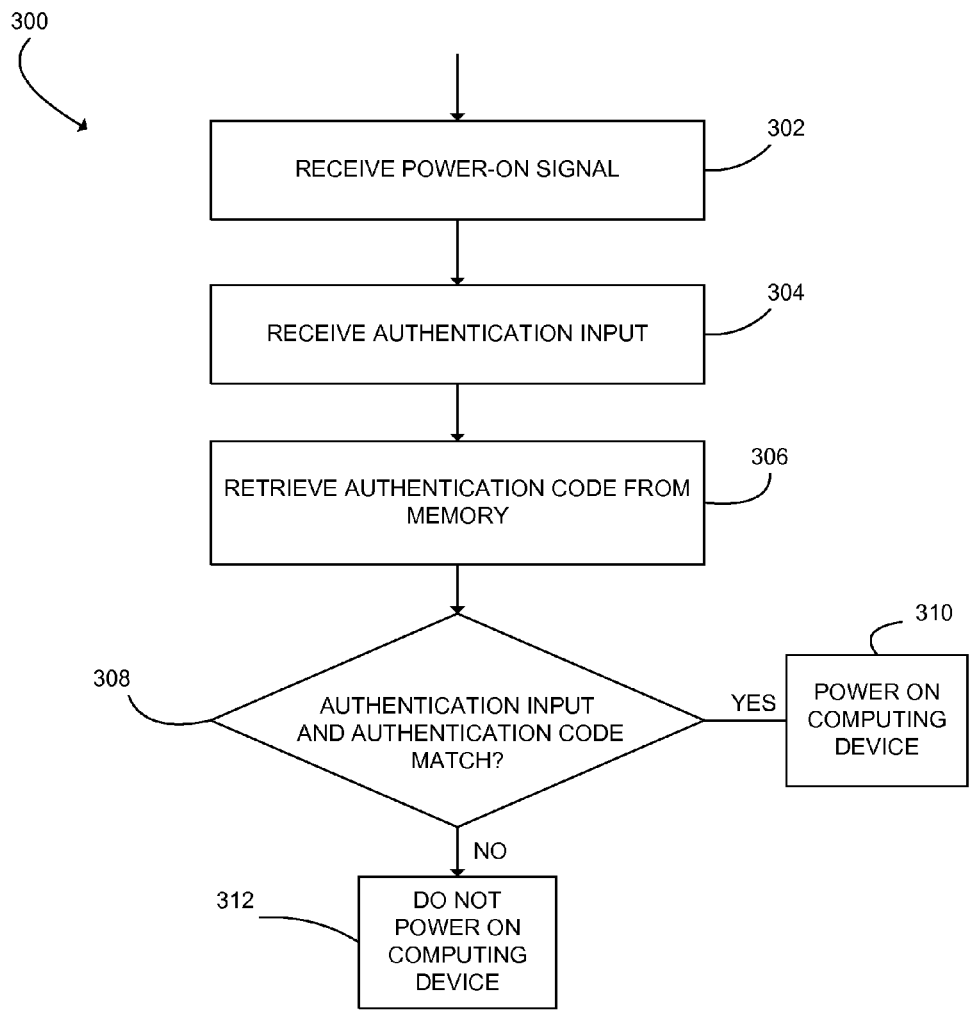
FIG. 3 is a simplified flow diagram of one embodiment of a method for power-on user authentication of the computing device of FIG. 1.

Several of the features of the security controller 110, including its persistent power connection and dedicated memory 114, allow the computing device 102 to provide power-on user authentication. To do so, as illustrated in FIG. 3, the computing device 102 may be configured to execute a method 300. In general, the method 300 involves the comparison of a received authentication input 208 and a retrieved authentication code 210. The method 300 may be executed by, for example, the security controller 110, in conjunction with other components of the computing device 102, which may interact with other components of the system 100.

The method 300 begins in block 302 in which the security controller 110 receives a power-on signal 206. As discussed above, the power-on signal 206 may be received from the power button 124. In other embodiments, the power-on signal 206 may be received from another component of the computing device 102 or a remote source. The security controller 110 may receive the power-on signal 206 by any known method. For example, in some embodiments, the power-on signal 206 may create a hardware or software interrupt that causes the security controller 110 to respond. In other embodiments, the security controller 110 may poll for the power-on signal 206.

After receiving the power-on signal 206 in block 302, the method 300 proceeds to block 304 in which the security controller 110 receives an authentication input 208. During block 304, the security controller 110 may monitor the keyboard 122, the NFC circuitry 126, and/or other input sources for the authentication input 208. As described above, the authentication input 208 may be supplied to the security controller 110 when a user enters a password on the keyboard 122 or when a particular NFC device 146 is brought into proximity with the NFC circuitry 126. The security controller 110 may receive the authentication input 208 by any known method. For example, in some embodiments, the authentication input 208 may create a hardware or software interrupt that causes the security controller 110 to respond.

After block receiving the authentication input, the method 300 proceeds to block 306 in which the security controller 110 retrieves the authentication code 210 from the dedicated memory 114. Of course, it should be appreciated that, block 306 may be performed prior to, or contemporaneously with block 304. The authentication code 210, representing one or more authorized users of the computing device 102, is retrieved from the dedicated memory 114. As discussed above, the retrieved authentication code 210 may be one or more hash values in some embodiments.

After block 306, the method 300 proceeds to block 308 in which the security controller 110 determines whether the authentication input 208 received in block 304 matches the authentication code 210 retrieved from the dedicated memory 114 in block 306. This comparison may be performed using any number of known methods. By way of example, where the retrieved authentication code 210 is a hash value, the security controller 110 may perform a hash of the authentication input 208 and compare the two hash values. A match between the authentication input 208 and the authentication code 210 indicates the presence of an authorized user of the computing device 102.

If the security controller 110 determines in block 308 that the authentication input 208 matches the authentication code 210, the method 300 proceeds to block 310 in which the security controller 110 supplies power to the primary processor 104, thereby allowing a power-on of the computing device 102. As noted above, the security controller 110 may also supply power to other components of the computing device 102 in response to determining that the authentication input 208 matches the authentication code 210.

If the security controller 110 determines in block 308 that the authentication input 208 does not match the authentication code 210, the method 300 instead proceeds to block 312 in which the security controller 110 withholds power from the primary processor 104, thereby preventing a power-on of the computing device 102. In some embodiments, the security controller 110 may take other appropriate action in block 312. For example, the security controller 110 may communicate a message to the user informing them that the primary processor 104 and/or other components of the computing device 102 will not power-on.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
   receiving, by a keyboard controller of a computing device, a power-on signal from a power button of the computing device, the power-on signal indicative of a user activation of the power button;
   initiating, by the keyboard controller, an authentication process in response to receiving the power-on signal, the authentication process comprising:

receiving an authentication input with a security controller of the keyboard controller prior to supplying power to a primary processor of the computing device;
retrieving an authentication code from a dedicated memory prior to supplying power to the primary processor; and
comparing the authentication input to the authentication code using the security controller prior to supplying power to the primary processor;
supplying power, by the keyboard controller, to the primary processor in response to the authentication input matching the authentication code;
receiving, by the security controller, a new authentication code from a remote server having an established trust relationship with the computing device in response to a request from a user after supplying power to the primary processor; and
replacing, by the security controller, the authentication code with the new authentication code in the dedicated memory.

2. The method of claim 1, wherein receiving the authentication input comprises receiving one or more keystrokes with the security controller.

3. The method of claim 1, wherein comparing the authentication input to the authentication code comprises:
calculating a hash value for the authentication input; and
comparing the hash value for the authentication input with the authentication code.

4. The method of claim 1, further comprising:
receiving a user request to change the authentication code after supplying power to the primary processor;
receiving a new authentication code with the security controller; and
replacing the authentication code with the new authentication code in the dedicated memory.

5. One or more non-transitory, machine-readable media comprising a plurality of instructions that, when executed by a keyboard controller of a computing device, cause the keyboard controller to:
receive a power-on signal from a power button of the computing device, the power-on signal indicative of a user activation of the power button;
initiate an authentication process in response to receiving the power-on signal, the authentication process to cause a security controller of the keyboard controller to:
receive an authentication input prior to supplying power to a primary processor of the computing device;
retrieve an authentication code from a dedicated memory prior to supplying power to the primary processor;
compare the authentication input to the authentication code prior to supplying power to the primary processor;
receive a new authentication code from a remote server having an established trust relationship with the computing device in response to a request from a user after supplying power to the primary processor; and
replace the authentication code with the new authentication code in the dedicated memory; and
supply power to the primary processor in response to the authentication input matching the authentication code.

6. The one or more non-transitory, machine-readable media of claim 5, wherein the plurality of instructions cause the security controller to receive the authentication input by registering one or more keystrokes.

7. The one or more non-transitory, machine-readable media of claim 5, wherein the plurality of instructions cause the security controller to:
calculate a hash value for the authentication input; and
compare the hash value for the authentication input with the authentication code.

8. The one or more non-transitory, machine-readable media of claim 5, wherein the plurality of instructions further cause the security controller to:
receive a user request to change the authentication code after supplying power to the primary processor;
receive a new authentication code; and
replace the authentication code with the new authentication code in the dedicated memory.

9. A computing device comprising:
a primary processor;
a power button to generate a power-on signal in response to a user activation of the power button;
a keyboard controller configured to execute a power management module, the keyboard controller comprising a security controller configured to execute an authentication module; and
a dedicated memory, the dedicated memory comprising the authentication module and an authentication code;
wherein the power management module, when executed by the keyboard controller, causes the keyboard controller to (i) receive the power-on signal from the power button, and (ii) initiate an authentication process in response to receiving the power-on signal, the authentication process to cause the security controller to execute the authentication module;
wherein the authentication module, when executed by the security controller, causes the security controller to (i) receive an authentication input prior to supplying power to the primary processor, (ii) compare the authentication input to the authentication code prior to supplying power to the primary processor, (iii) receive a new authentication code from a remote server having an established trust relationship with the computing device in response to a request from a user after supplying power to the primary processor, and (iv) replace the authentication code with the new authentication code in the dedicated memory;
wherein the power management module, when executed by the keyboard controller, is further to supply power to the primary processor in response to the authentication input matching the authentication code.

10. The computing device of claim 9, wherein:
the dedicated memory further comprises a keyboard module;
the security controller is further configured to execute the keyboard module; and
the keyboard module, when executed by the ancillary processor, causes the security controller to receive the authentication input by registering one or more keystrokes.

11. The computing device of claim 9, wherein the dedicated memory is accessible only to the security controller.

12. The computing device of claim 9, wherein the keyboard controller is an embedded controller configured for power management of the computing device.

* * * * *